| United States Patent [19] | [11] Patent Number: 5,060,831 |
| --- | --- |
| Fishler et al. | [45] Date of Patent: Oct. 29, 1991 |

[54] MATERIAL FOR COVERING A CASTING SHROUD

[75] Inventors: Mark K. Fishler, Naperville, Ill.; Gilbert Rancoule, Maubeuge, France

[73] Assignee: Vesuvius Crucible Company, Pittsburgh, Pa.

[21] Appl. No.: 477,850

[22] PCT Filed: Jun. 28, 1989

[86] PCT No.: PCT/FR89/00337

§ 371 Date: Feb. 12, 1990

§ 102(e) Date: Feb. 12, 1990

[87] PCT Pub. No.: WO90/00102

PCT Pub. Date: Jan. 11, 1990

[51] Int. Cl.$^5$ .............................................. C04B 35/48
[52] U.S. Cl. ................................... 222/591; 266/280; 501/104
[58] Field of Search ................ 501/104, 101; 222/591, 222/606, 607, 594; 266/280, 286

[56] References Cited

U.S. PATENT DOCUMENTS 4,691,844  9/1987  Ishino et al. ...................... 222/591
4,849,383  7/1989  Tanemura et al. .................. 501/104

FOREIGN PATENT DOCUMENTS 0135482  3/1985  European Pat. Off. ..
0242849  10/1987 European Pat. Off. ..
0985427  7/1951  France .
2007089  1/1970  France .
2529540  1/1984  France .

OTHER PUBLICATIONS

Patent Abstracts of Japan, vol. 12, No. 343, 9-14-88, (M-714)(3190).
Patent Abstracts of Japan, vol. 12, No. 381, 10-12-88 (M-752)(3228).

*Primary Examiner*—S. Kastler
*Attorney, Agent, or Firm*—Webb Burden Ziesenheim & Webb

[57] ABSTRACT

The invention concerns a material for the covering of casting shrouds.

It is comprised of a calcareous composition capable of liberating calcium oxide at a temperature at least equal to 1400° C., its calcium content, expressed in calcium oxide, is between ca. 10% and ca. 60% and preferably between ca. 20% and ca. 50%, the said calcareous composition is bound by a binder chosen in the group comprised of those utilizing carbon/carbon bonds by sintering.

Application to the metallurgy of ferro-alloys.

15 Claims, No Drawings

MATERIAL FOR COVERING A CASTING SHROUD

The object of the present invention is a new material for covering a casting shroud. More particularly, it concerns casting shrouds for killed steels or ferro-alloys with aluminum or containing it.

Following the reducing steel smelting operations and iron-into-steel conversion, the metal contains non-negligible amounts of dissolved oxygen. This oxygen is quite pernicious, notably during casting operations and in general working of the metal.

In order to suppress this dissolved oxygen, calming agents are employed. Among the latter, silicon, carbon, magnesium and aluminum can be cited. It is primarily this latter metal, alloyed or not, that is used to kill or calm steels, the results of which are the best.

Nevertheless, during casting operations, for reasons and under conditions that are still poorly known, fine particles of alumina accumulate in the casting shrouds, e.g., such as the nozzles, capable of causing an almost total blockage and a definite problem in the normal development of the casting systems.

In order to alleviate these difficulties, an initial solution consists in frequently changing the casting elements where alumina accumulates. This solution is expensive and considerably shortens the service life of the casting nozzles, notably those which convey the metal emerging from the distributor in the case of continuous casting.

In order to increase the service life of the nozzles, another solution consists in reducing the amount of aluminum to be added as much as possible. This palliative method is however not satisfactory.

At the beginning of the 1980's, studies conducted by Emilio Marino and Aldo Ramacciotti led to the French patent published under No. 2,529,540. It is indicated in this document that it is possible to avoid any accumulation of alumina in the nozzles, since these latter are produced from lime, if necessary, with some additive elements. These elements, the sum of which is between 3% and 25% by wt., are designed to promote the growth of the grains.

This technique, which definitely gives good results with regard to the accumulation of alumina grains, has a major shortcoming, that of the necessary precautions in the storage and transport of these nozzles. In effect, such a refractory material, comprised for the most part, even up to 100%, of unhydrated lime, is extremely reactive with respect to humidity, which results in a loss of mechanical property when such a casting element has been subjected to moisture.

This is why a new research approach has been developed, according to which the parts of the casting elements in contact with the molten metal are covered with a mineral layer that forms eutectics having a low melting point with alumina. These eutectics are washed and entrained with the alumina by the flowing of the molten metal.

This technique certainly constitutes a substantial improvement as compared with the existing techniques; however, it replaces the accumulation of alumina with an erosion of the alumina anti-accumulation layer, which reduces the service life of the casting elements.

Use of composite material of the SiAlON type offers a significant advance (cf. D. B. Hoggard, G. I. Rancoule, L. C. Myers, H. K. Park, and M. K. Fishler, "Development of a liner to reduce alumina buildup in graphitized alumina submerged pouring nozzles used in the continuous casting of steel", published at the second international conference on refractory materials, "Refractories '87, TOKYO, Japan, November 10–13, 1987"), but not a decisive one.

This is why one of the purposes of the present invention is to furnish a material for covering the pouring elements to avoid alumina accumulation.

Another purpose of the present invention is to furnish casting elements in which the accumulation of alumina is difficult, even impossible.

Another purpose of the present invention is, finally, to furnish a casting process for ferro-alloys killed with aluminum or with one of its alloys, such as the aluminum/magnesium alloys utilizing the said casting elements.

These purposes and others that will appear below are achieved by means of a material for covering the casting elements, characterized by the fact that it has a calcareous composition capable of liberating calcium oxide, under the conditions of use, at a temperature at least equal to 1400° C., due to the fact that its calcium content, expressed in calcium oxide, is between ca. 10% and ca. 60% and preferably between ca. 20% and ca. 50% and due to the fact that the said calcareous composition is bound by means of a binder chosen among the group comprised of those utilizing bonds of the carbon/carbon type by sintering.

The above percentages are percentages by wt.

During the study that was conducted on the present invention, it was in effect demonstrated that with such a composition, during the casting of a ferro-alloy killed with aluminum or with one of its alloys, such as the aluminum/magnesium alloys, a layer of an eutectic or an eutectoid mixture, the alumina/calcium oxide ratio of which is in the vicinity of 6:1, developed in contact with the metal rich in aluminum. This layer has the surprising property of playing an anti-adhesive role with respect to alumina and an adhesive role with respect to the basic material, perhaps due to the affinity of the latter for calcium. Thus, this layer prevents any accumulation of alumina and by remaining fixed on the casting element itself protects the latter from wear by entrainment with the casting of steel or ferro-alloy.

Thus, after the first casting, provided the ferro-alloy was sufficiently rich in aluminum, the faces in contact with the ferro-alloy that are covered with the said material become covered at least partially with a composition that can be qualified as an eutectoid and whose alumina/unhydrated lime molar ratio is in the vicinity of 6:1.

The host material of the calcium, generally in the form of oxide, should preferably have a sufficient affinity for the lime to assure its stability, even in a relatively humid atmosphere, i.e., that it should avoid a phenomenon abundantly described in the literature of thermodynamic reactions between oxidized products and water, according to which the reaction of formation of slaked lime is a very strongly exothermic reaction of hydration of the unhydrated lime, this reaction being followed by a considerable volumetric swelling (capable of breaking physical bonds by expansion).

The host material should also have the property of being sufficiently little bound to the unhydrated lime and of liberating the latter sufficiently during casting, so that it can combine with alumina and form, possibly with various other impurities, an interfacial phase that can be qualified as an eutectoid.

The host material and the calcareous composition should be refractory at the casting temperature. The calciferous composition should be as homogeneous as possible in the particular range and is preferably realized by melting or by reaction in the solid state of the host material with a calcium compound such as quick lime.

The host material can be used either pure or in the presence of slight amounts of additive elements.

The model and best representative of the host material is zirconia ($ZrO_2$); this is why the said calciferous composition preferably contains zirconia ($ZrO_2$), advantageously in a proportion varying from 40% to 85% and calcium oxide in a proportion varying from 15% to 60%, preferably between ca. 23% and 50%. These proportions do not take into account the binding agents used to assure cohesion of the material. The element can be made either in a single block or piece by isostatic pressing, followed by the formation of bonds by hot sintering, or in the form or by means of an insert; the element itself and the insert can be baked separately. It is also possible to bake one of the two pieces first and then rebake the whole to assure a better cohesion between the pieces. However, this solution presents the disadvantages of being relatively costly, whatever technical interest it may have otherwise.

These elements are produced by a technique chosen from the group comprised of isostatic pressing, uniaxial pressing, vibrocasting or casting, followed by a sintering in a reducing atmosphere in order to create a carbon/carbon bond for the entire element.

The part of the casting element that is not comprised of the said material for covering the element is produced by familiar techniques with familiar materials. In particular, it can be produced, and the technician will immediately perceive the great advantage of this, of compounds of alumina and/or zirconia, as is the case for most of this type of apparatuses.

The present invention is particularly suitable for the production of casting nozzles and, more particularly, those that are jet protection tubes for the casting of aluminum-killed ferrous alloy between the distributor and the continuous casting device. The nozzle thus plays the role of jet protection tube.

The present invention also envisions a continuous casting process for ferro-alloy killed with aluminum or one of its alloys, characterized in that the said elements are covered with the material on their part in contact with the casting to avoid striction phenomena due to the deposit of alumina in the casting elements.

During this process, a layer of alumina/calcium oxide eutectoid compounds in a ratio close to 1:6 is formed during the casting, this latter occurring at a temperature above 1400° C.

In the numbers above, the zeros are not significant numbers, but serve simply to fix the position of the significant numbers.

Although reference was made only to ferro-alloys as well as steels in the present specification, the present invention can be applied to the casting of any liquid metal during which there is the risk of an accumulation of alumina.

The following nonlimiting examples provide the technician with a better understanding of the interest of the present invention.

EXAMPLES 1-4

A covering material according to the present invention was produced from molten zirconia stabilized with calcium oxide with various percentages of calcium oxide. The operating method employed is as follows:

The zirconia-lime material is preliminarily blended with graphite and organic and mineral adjuvants designed to give it the properties suitable for its use during the casting of steels (including: resistance to oxidation, plasticity during shaping, mechanical strength, etc.). The materials are shaped by copressing the refractory compositions according to the geometry desired for the casting nozzle. The piece should then undergo the baking cycles required for achieving the carbon bond, then imparting its specific properties to the material. The products can be machined or not, depending on their application.

The compositions of the various covering materials are indicated in Table I below and the physical properties of the new anti-accumulation layer are given in Table II.

TABLE I

| Composition of anti-alumina layers | | | | |
|---|---|---|---|---|
| | Ex. 1 | Ex. 2 | Ex. 3 | Ex. 4 |
| Granular molten zirconia* (14% CaO) | 48.6 | 44.7 | — | — |
| Fine molten zirconia* (14% CaO) | 25.7 | 23.6 | — | — |
| Granular molten zirconia* (26% CaO) | — | — | 47.9 | 44.2 |
| Fine molten zirconia* (26% CaO) | — | — | 25.3 | 23.4 |
| Graphite | 11.9 | 16.4 | 11.7 | 16.2 |
| Metallic silicon | 3.6 | 3.3 | 3.5 | 3.3 |

*Product commercialized by Cookson Industries.

TABLE II

| | PHYSICAL PROPERTIES OF THE ANTI-ACCUMULATION LAYER | | | | | | |
|---|---|---|---|---|---|---|---|
| | Apparent volumetric mass g/cm³ | Apparent density | Porosity % | Mechanical strength kg/cm² | | Class for alumina accumulation | Erosion problem | Coefficient of thermal expansion ($\times 10^{-6}$ C) |
| Example | | | | Horiz. modulus of rupture | Vert. | | | |
| 1 | 3.22 | 4.05 | 20.5 | 86 + 13 | 64 + 5 | 2.7 | No | 5.73 |
| 2 | 3.16 | 3.78 | 16.4 | 122 + 14 | 93 + 6 | 2.3 | No | 5.00 |
| 3 | 3.21 | 3.84 | 16.3 | 139 + | 110 + | 2.0 | No | 6.17 |
| 4 | 3.09 | 3.64 | 15.1 | 127 + 9 | 106 + 2 | 1.8 | No | 4.70 |

We claim:

1. A refractory composition for resisting buildup of oxides during casting operations consisting of carbon and a homogeneous, fused mixture of calcium oxide and zirconium oxide, said fused mixture consisting essentially of in weight percent between about 23% to about 50% calcium oxide and between about 50% to about 80% zirconium oxide.

2. The refractory composition of claim 1 wherein the carbon includes a graphite constituent.

3. The refractory composition of claim 1 which includes one or more additional refractory materials therein.

4. The refractory composition of claim 3 wherein one of the additional refractory materials includes silicon.

5. The refractory composition of claim 1 wherein the zirconium oxide is stabilized zirconium oxide.

6. The refractory composition of claim 1 wherein the zirconium oxide is stabilized with calcium oxide.

7. A nozzle for use in casting molten metal, said nozzle comprising a body of a refractory material and having a refractory liner portion formed therein adapted to resist oxide buildup during casting operations, said refractory liner consisting of carbon and a homogeneous, fused mixture of calcium oxide and zirconium oxide, said fused mixture consisting essentially of in weight percent between about 23% to about 50% calcium oxide and between about 50% to about 80% zirconium oxide.

8. The nozzle of claim 7 wherein the carbon in the liner portion includes a graphite constituent.

9. The nozzle of claim 19 wherein the liner portion includes one or more additional refractory materials.

10. The nozzle of claim 9 wherein one of the additional refractory materials in said liner portion is silicon.

11. The nozzle of claim 7 wherein the homogeneous, fused mixture of calcium oxide and zirconium oxide contains about 25% calcium oxide.

12. The nozzle of claim 11 wherein the carbon in the liner portion includes a graphite constituent.

13. The nozzle of claim 11 wherein the liner portion includes one or more additional refractory materials.

14. The nozzle of claim 7 wherein the zirconium oxide in the liner portion is stabilized zirconia.

15. The nozzle of claim 14 wherein the zirconium oxide is stabilized with calcium oxide.

* * * * *

UNITED STATES PATENT AND TRADEMARK OFFICE
CERTIFICATE OF CORRECTION

PATENT NO. : 5,060,831

DATED : October 29, 1991

INVENTOR(S) : Mark K. Fishler and Gilbert Rancoule

It is certified that error appears in the above-identified patent and that said Letters Patent is hereby corrected as shown below:

Claim 9 Line 5 Column 6 "19" should read --7--.

Signed and Sealed this

Twentieth Day of April, 1993

Attest:

MICHAEL K. KIRK

*Attesting Officer*  *Acting Commissioner of Patents and Trademarks*